United States Patent [19]

Satake et al.

[11] Patent Number: 5,119,721

[45] Date of Patent: Jun. 9, 1992

US005119721A

[54] APPARATUS FOR PRODUCING WASHED RICE

[75] Inventors: Toshihiko Satake, Higashihiroshima; Satoru Satake, Tokyo; Katsuyuki Kumamoto, Mihara; Shigeru Ariji, Higashihiroshima, all of Japan

[73] Assignee: Satake Engineering Co., Ltd., Tokyo, Japan

[21] Appl. No.: 748,243

[22] Filed: Aug. 21, 1991

[30] Foreign Application Priority Data

Aug. 27, 1990 [JP] Japan .................................. 2-226217
Nov. 28, 1990 [JP] Japan .................................. 2-333153
Dec. 18, 1990 [JP] Japan .................................. 2-412000

[51] Int. Cl.[5] .......................... B02B 3/00; B08B 3/06; A23N 17/00

[52] U.S. Cl. ........................................ 99/519; 99/536; 99/600; 99/609; 134/65; 134/132; 366/234; 366/318

[58] Field of Search ................. 99/487, 516, 519, 520, 99/534, 536, 600, 609; 134/65, 132; 366/224, 234, 235, 318, 319; 100/117, 145

[56] References Cited

U.S. PATENT DOCUMENTS

| | | | |
|---|---|---|---|
| 787,108 | 4/1905 | Oliver | 99/536 X |
| 871,517 | 11/1907 | McDaniel | 99/536 |
| 2,295,918 | 9/1942 | Thomas | 134/65 |
| 2,314,871 | 3/1943 | De Back | 134/65 |
| 3,135,668 | 6/1964 | Wesson | 134/132 |
| 4,055,673 | 10/1977 | Mueller et al. | 99/519 |
| 4,741,264 | 5/1988 | McPeak | 366/318 |
| 4,875,344 | 10/1989 | Zittel | 366/319 |
| 4,993,316 | 2/1991 | Greer | 99/516 |
| 5,020,555 | 6/1991 | Nishibayashi et al. | 134/132 |
| 5,033,371 | 7/1991 | Satake et al. | 99/519 |

FOREIGN PATENT DOCUMENTS

| | | | |
|---|---|---|---|
| 489668 | 1/1930 | Fed. Rep. of Germany | 134/132 |
| 2161446 | 3/1973 | Fed. Rep. of Germany | 134/65 |
| 1091820 | 4/1989 | Japan | 99/536 |

*Primary Examiner*—Timothy F. Simone
*Attorney, Agent, or Firm*—Darby & Darby

[57] ABSTRACT

A washed rice producing apparatus includes a frame; a first tubular member, arranged within the frame, for defining a rice-washing chamber therein for washing polished rice introduced therein from one end thereof, the rice-washing chamber having a discharge end portion; an agitating member, arranged in the first tubular member, for agitating the polished rice in the rice-washing chamber; a spiral member supported on the frame to be rotatable about an axis thereof for transporting washed, polished rice discharged from the discharge end portion of the rice-washing chamber while dewatering the washed polished rice; and a second tubular member provided in the frame to be rotatable about the axis and to externally surround the spiral member for defining a dewatering chamber in cooperation with the spiral member, the second tubular member including a circumferential wall having many penetrating holes formed therethrough for draining off water separated from the washed polished rice transported by the spiral member. The washed rice producing apparatus is capable of reducing the installation space thereof.

8 Claims, 10 Drawing Sheets

APPARATUS FOR PRODUCING WASHED RICE

BACKGROUND OF THE INVENTION

The present invention relates to an apparatus and method for producing so called "washed rice".

Most of bran has been removed from surfaces of rice grains called "polished rice" produced by milling or polishing rice grains or kernels by rice polishing machine. A considerable amount of fine bran however still adheres to and remains on surfaces of polished rice. Thus, to produce boiled rice, the polished rice is further washed with water, and is then boiled. Moreover, it is necessary to steep or dip the rice in water for a certain period of time to raise the water content in the polished rice so that the whole region of each rice grain may be uniformly boiled.

The washing of rice with water and steeping or dipping it in water however take considerable time and are laborious. Housewives do not like these operations. In mass production of boiled rice, there is a problem in that a large amount of waste water having used for washing rice is liable to cause pollution of water in addition to the problem of taking rather long time to wash rice and steep it in water. Accordingly, it is strongly desired that rice which may be boiled at once by merely adding water without such washing and steeping operations is supplied.

In this specification (description) and claims, the term "washed rice" is referred, on the hand, broadly to as rice which has been washed with water to such a degree that bran on surfaces of polished rice is substantially removed, and which needs no washing with water before boiling. On the other hand, the term "washed rice" is also referred to, in a narrow sense, as rice which may be boiled at once after water is added without being washed with water or steeped in water. When rice which has been sufficiently polished is sufficiently washed with water, bran is substantially removed from surfaces of the polished rice. Thus, the polished rice washed with water usually does not need steeping in water for a substantial period of time before boiling, and hence washed rice in a broad sense is usually the same as washed rice in a narrow sense.

When polished rice is washed with water, water content thereof increases during washing. Furthermore, water content of polished rice increases if water adheres to or contacts surfaces of polished rice after water-washing thereof. The water content of polished rice is usually 14 to 15% by weight. When the water content becomes beyond 16% by weight, the polished rice is liable to go bad, and it is practically impossible to store it for a long period of time.

Thus, for producing washed rice, both steps of washing the polished rice, and dewatering or removing moisture or water from surfaces of polished rice are indispensable.

Japanese Patent Laid-open (unexamined) Publication No. 1-308779(A) laid open for public inspection on Dec. 13, 1989 discloses a technique in which a rise in water content in the rice grains or kernels is suppressed by washing polished rice with water for a short limited time within 10 seconds and by rapidly dewatering it after washing.

In Japanese Patent Laid-open (unexamined) Publication No. 2-242647(A) laid open on Sept. 27, 1990, there is proposed a technique that steps of water washing and removing water of polished rice are performed for a short time so that the water content of washed rice after the both steps is below 16 weight %.

In this Japanese Patent Laid-open Publication No. 2-242647(A) the "washing rice with water" is defined as washing an amount of rice grains or kernels in such a large amount of water to steep it under water level while agitated or stirred.

Heretofore, continuous rice washing machines in which a great amount of polished rice is washed by stirring it in water have been known (for example, Japanese Patent Laid-open (unexamined) Publication No. 62-282648(A)). It has been also proposed to perform washing of rice, using a rice polisher (Japanese Patent Laid-open Publication No. 1 (1989)-308779(A)).

Other earlier attempts or disclosures are that dewatering is carried out by an air ejection drier (Japanese Patent Laid-open (unexamined) Publication No. 1 (1989)-308779(A), and that a dewatering unit is provided at the outlet of a rotary continuous rice washing machine to continuously conduct dewatering (Japanese Patent Laidopen (unexamined) Publication No. 2 (1990)-242647(A)).

These attempts were, however, mere aggregation of known apparatuses, and the whole equipment for producing washed rice by continuously performing washing and dewatering of polished rice rather increases in size and hence in stallation space.

The inventors have proposed a washed rice producing apparatus including two rice washing units, a dewatering unit and a drying unit in Japanese Patent Application No. 1 (1989)-244499, which was substantially kept secret and was not laid open to public as of Dec. 18, 1990. Also, in this washed rice producing apparatus, such a problem of increasing in size of the whole apparatus remains unsolved.

SUMMARY OF THE INVENTION

In view of the problem previously described the present invention has been made, and the first object of the present invention is to provide a washed rice producing apparatus which is capable of reducing the installation space thereof.

According to the present invention, this object can be achieved by a washed rice producing apparatus comprising: a frame; a first tubular member, arranged in the frame, for defining a rice-washing chamber therein for washing polished rice introduced therein from one end thereof, the rice-washing chamber having a discharge end portion; agitating means, arranged within the first tubular member, for agitating the polished rice in the rice-washing chamber; a spiral member supported on the frame to be rotatable about an axis thereof for transporting washed, polished rice discharged from the discharge end portion of the rice-washing chamber while dewatering the washed polished rice; and a second tubular member provided in the frame to be rotatable about the axis and to externally surround the spiral member for defining a dewatering chamber in cooperation with the spiral member, the second tubular member including a circumferential wall having plural penetrating holes formed therethrough for draining off water separated from the washed polished rice transported by the spiral member.

In this washed rice producing apparatus, polished rice is washed with water under the action of the agitating means in the rice washing chamber within the first tubular member in a relatively short period of time, so that bran remained on a surface of the rice is removed. Furthermore, water adhered to surfaces of washed polished rice are removed by the rotation of the spiral member during transportation of the rice in the dewatering chamber, and are drained off through the penetrating holes formed through the wall of the second tubular member. The dewatered polished rice is dried to produce washed rice. The occupation space of the whole apparatus may be reduced since the first and second tubular members are disposed in the frame, that is, within the installation space occupied by the frame.

According to one preferred embodiment of the present invention, the first and second tubular members are arranged substantially in series so that the washed polished rice discharged from the rice-washing chamber enters the dewatering chamber; and in the dewatering chamber within the second tubular member the washed polished rice is dried. Accordingly, it is not necessary to provide a drying station separate from the dewatering station, and thus the whole apparatus may be reduced in size. Furthermore, the axis of each of the first and second tubular members is preferably horizontal or vertical. In the case where the axis of each of the first and second tubular members is vertical, the second tubular member is disposed above the first tubular member. In this case, the installation space of the apparatus may be further reduced.

According to another embodiment of the present invention, the first tubular member is rotatable about a vertical axis thereof, and polished rice is introduced into the first tubular member from an upper end portion thereof. The spiral member is disposed around the outer circumferential wall of the first tubular member so that washed polished rice deposited at the lower portion of the rice-washing chamber is elevated along the outer circumferential wall of the first tubular member while being dewatered. The second tubular member is rotatable about the axis relative to the first tubular member. Accordingly, the first tubular member takes following roles; it defines not only the outer circumferential wall of the rice-washing chamber but also the inner circumferential wall of the dewatering chamber; and the first tubular member supports the spiral member. Thus, the installation space of the apparatus may be further reduced. In another preferred embodiment of the present invention, the dewatering chamber extends vertically upwardly, and rewashing water supplying means is disposed in an intermediate portion of the dewatering chamber for supplying water to rewash washed polished rice. The apparatus of this preferred embodiment is capable of producing washed rice from which adhering materials, such as bran, remaining on surfaces of the rice are practically completely removed. The rewashing water supplying means preferably comprises nozzle means extending through the outer circumferential wall of the first tubular member and opening to the dewatering chamber.

The foregoing and other objects, features as well as advantages of the invention will be explained hereinafter by preferred embodiments of the invention with reference to the attached drawings.

Figure 3:
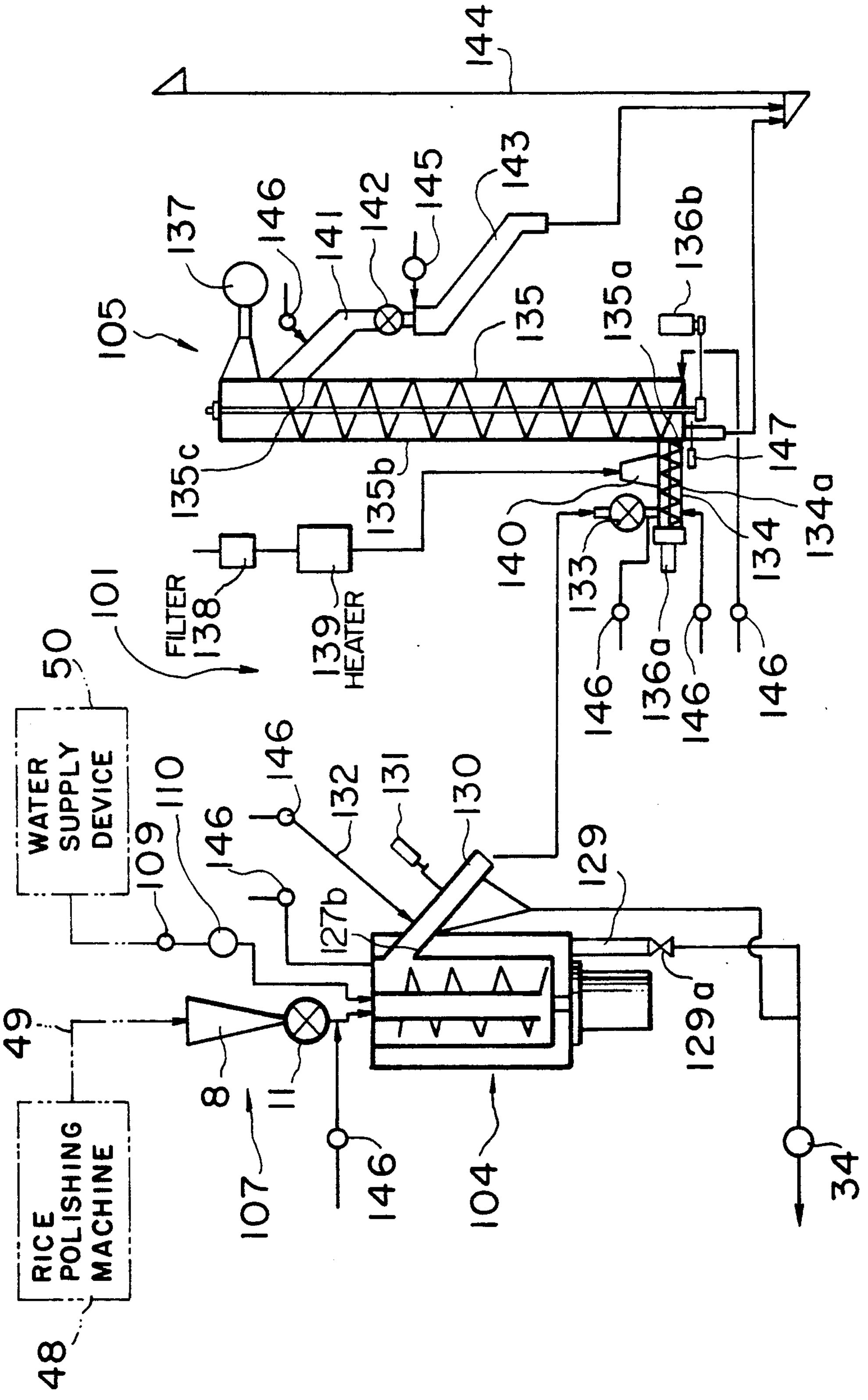
FIG. 3 is a schematic illustration of a washed rice producing apparatus according to a third embodiment of the present invention.
Figure 5:
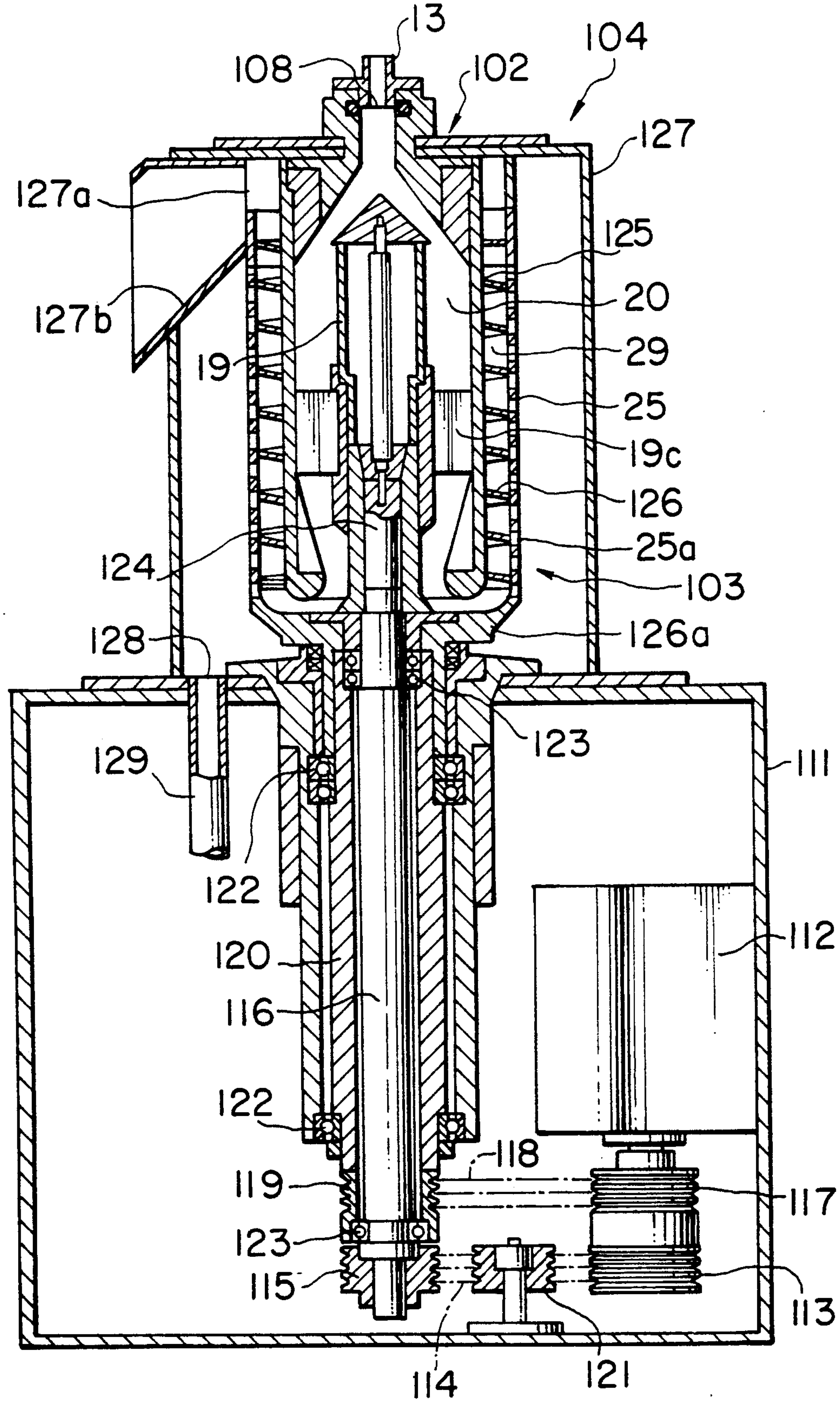
Figure 6:
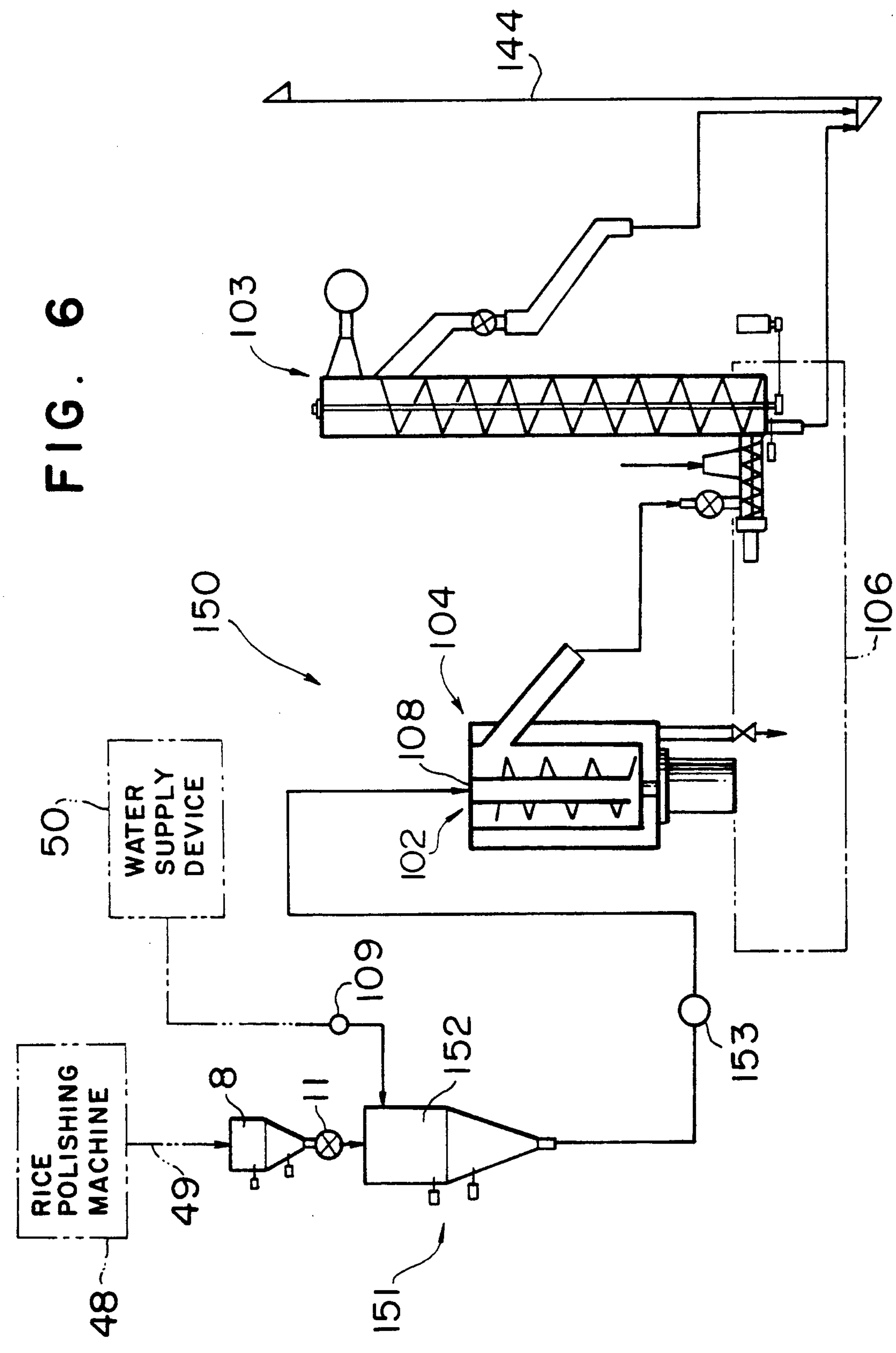
Figure 7:
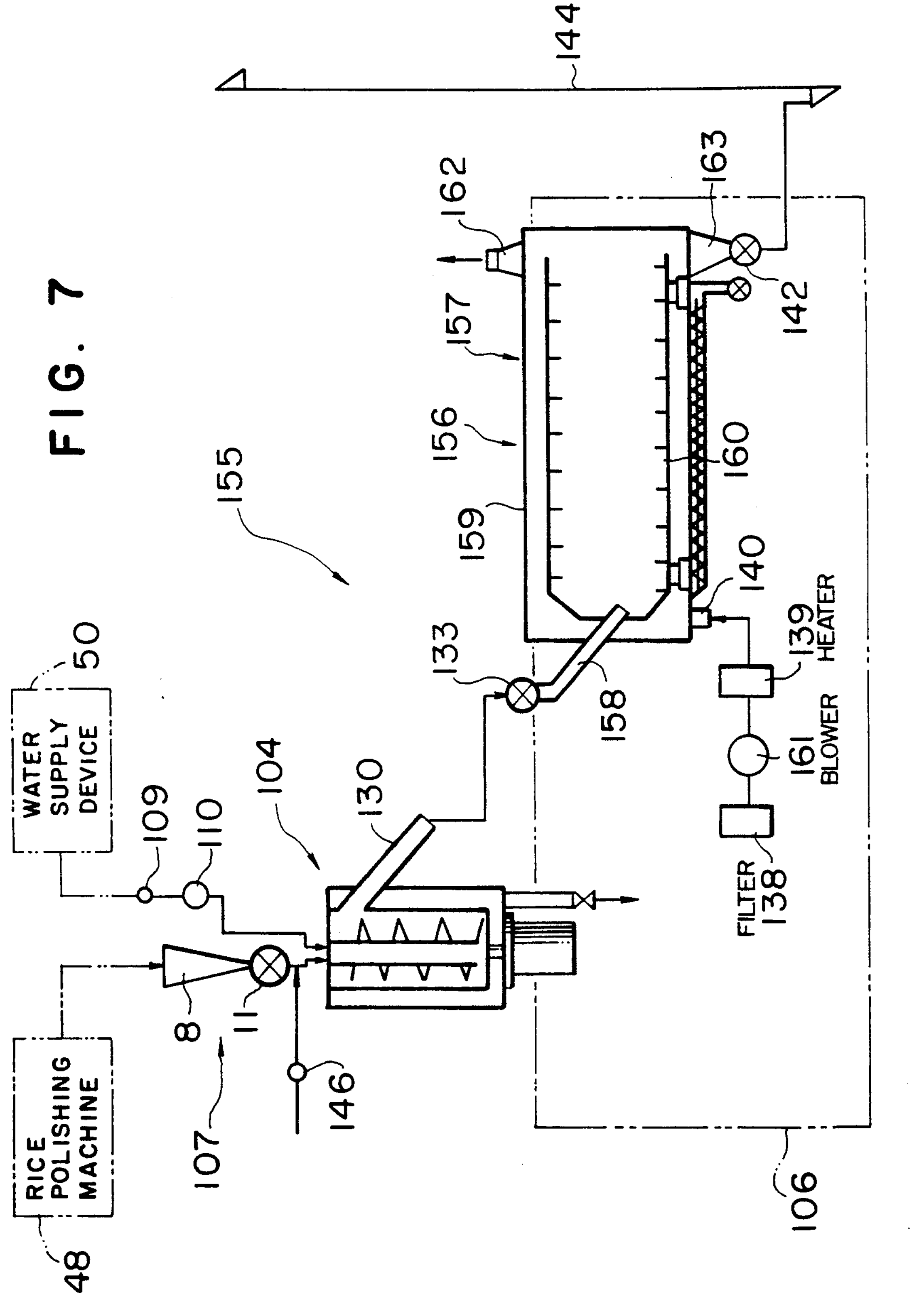
Figure 8:
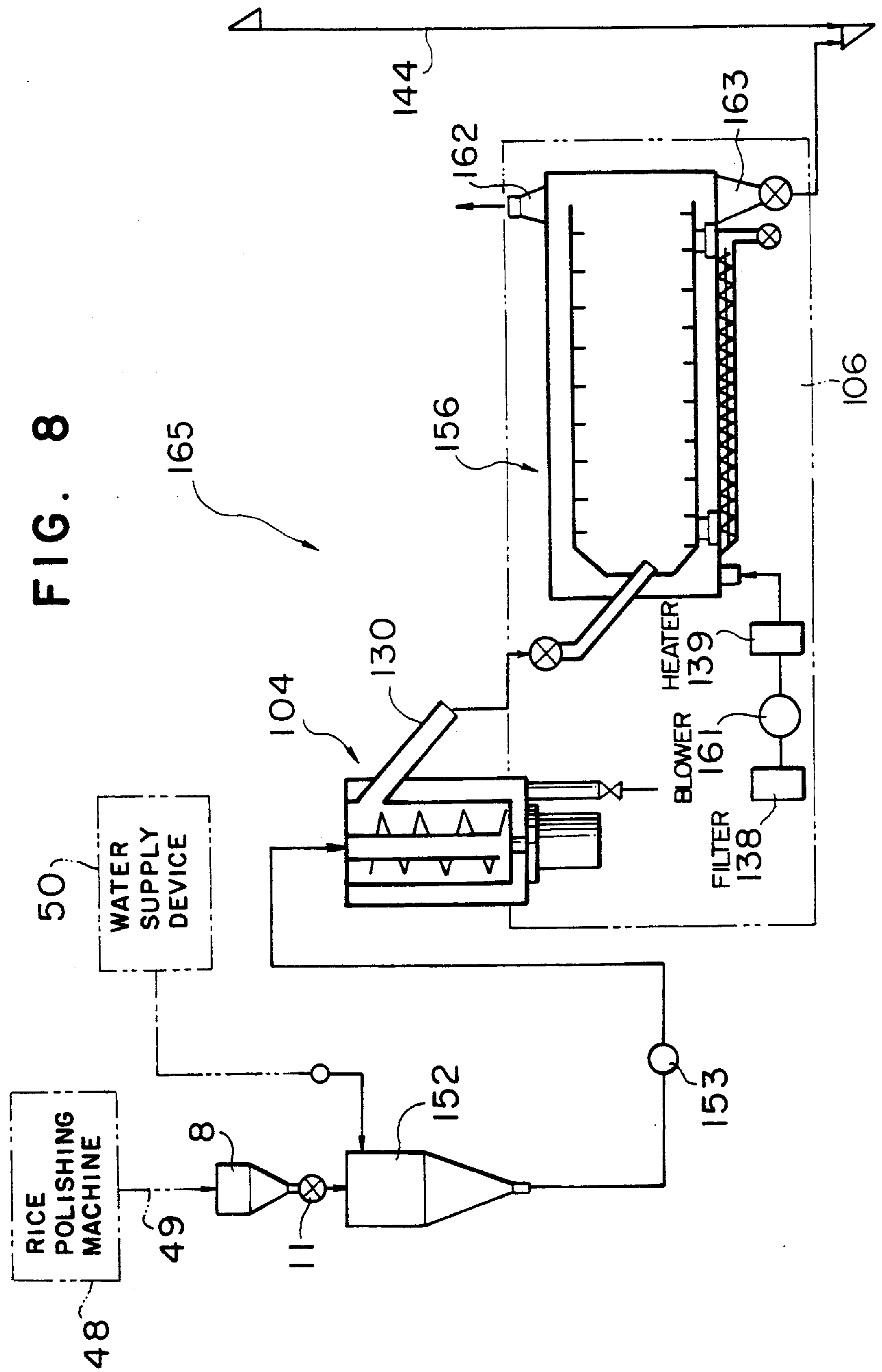
Figure 9:
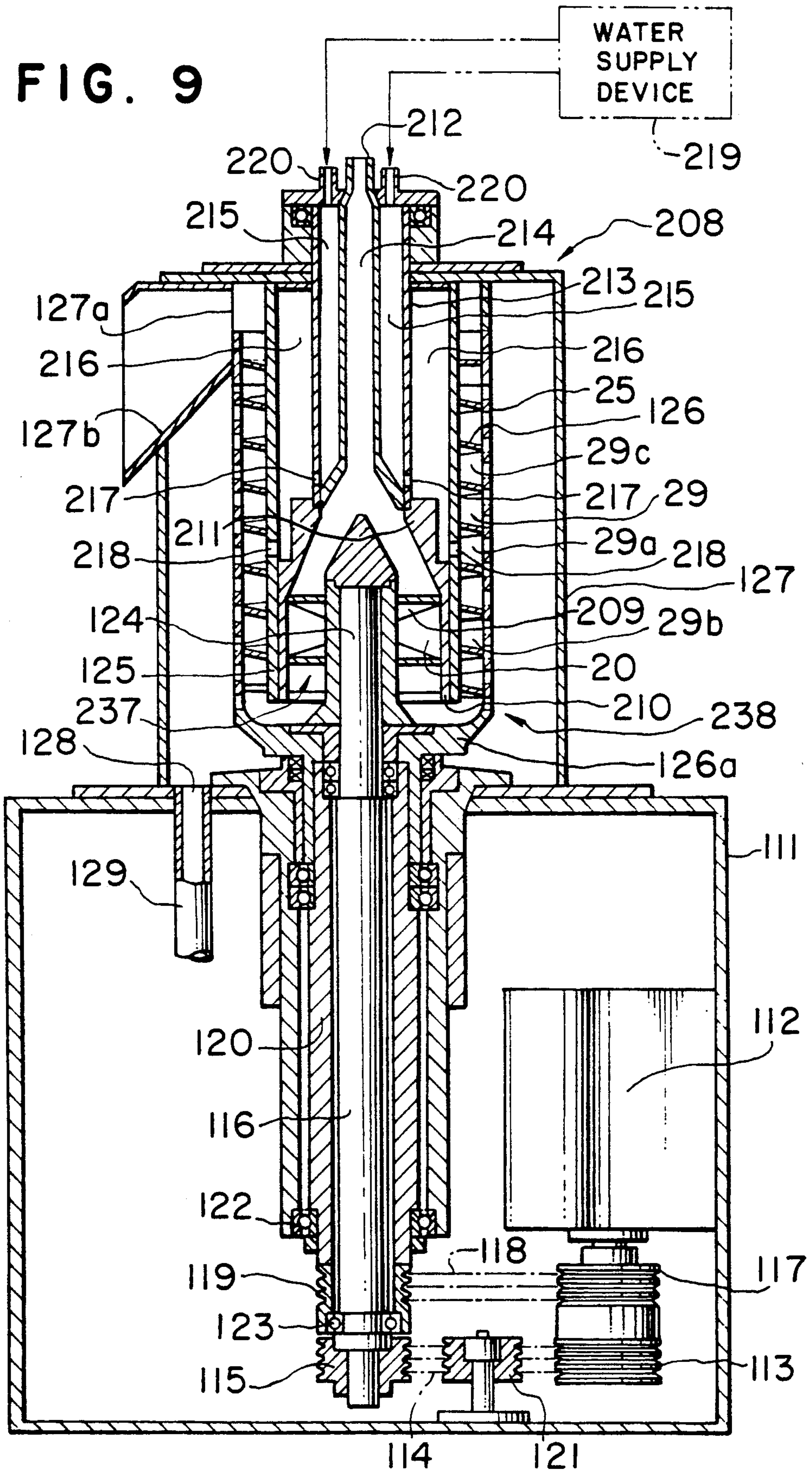
Figure 10:
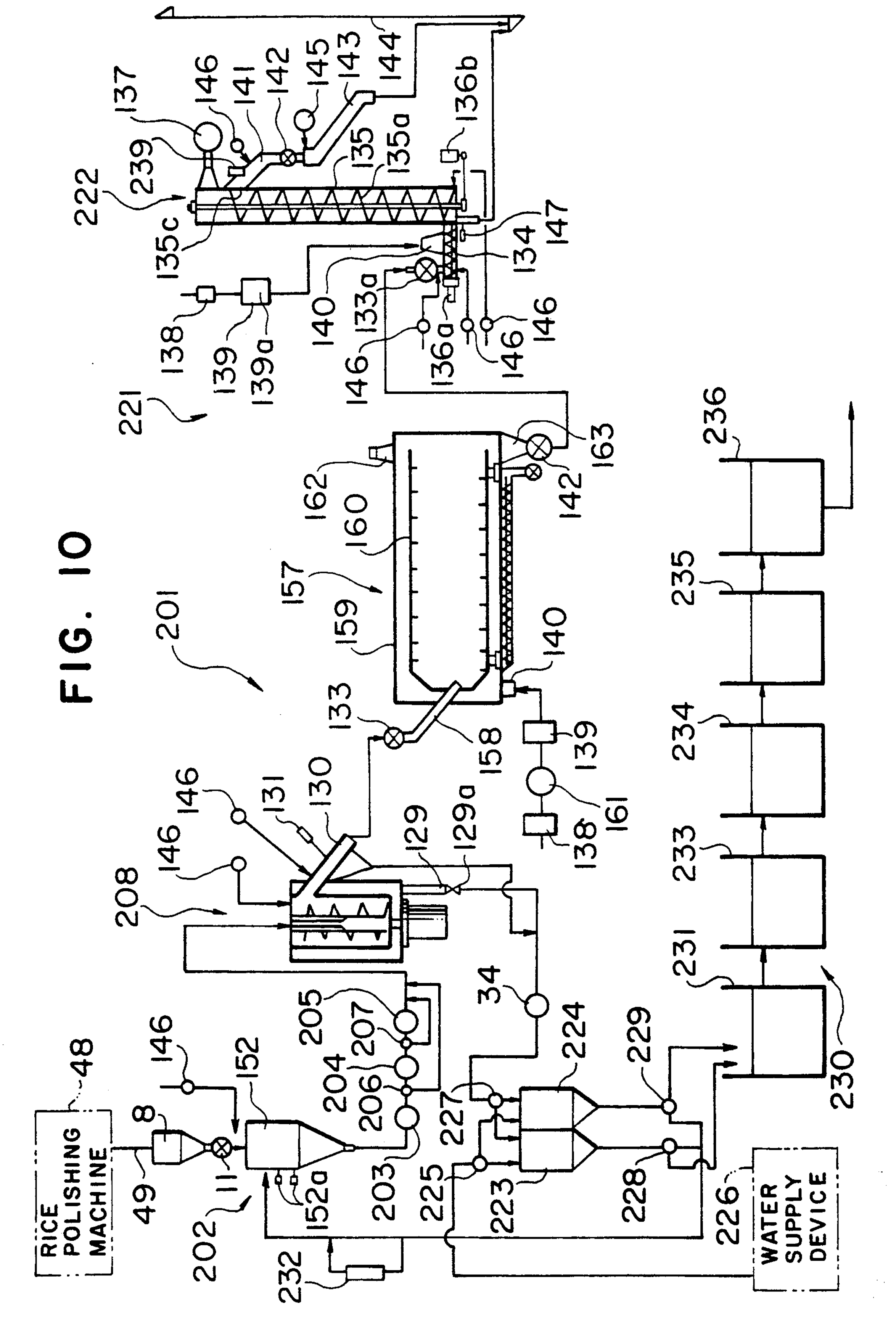

Fog. 4 is a front view of the washed rice producing apparatus of FIG. 3;

FIG. 5 is a vertical sectional view of a rice-washing and dewatering station of the washed rice producing apparatus of FIG. 3;

FIG. 6 is a schematic illustration of a washed rice producing apparatus according to a fourth embodiment of the present invention;

FIG. 7 is a schematic illustration of a washed rice producing apparatus according to a fifth embodiment of the present invention;

FIG. 8 is a schematic illustration of a washed rice producing apparatus according to a sixth embodiment of the present invention;

FIG. 9 is a vertical sectional view of a rice-washing and dewatering station of a washed rice producing apparatus according to a seventh embodiment of the present invention; and FIG. 10 is a schematical illustration of the washed rice producing apparatus according to the seventh embodiment of the present invention.

DETAILED DESCRIPTION OF PREFERRED EMBODIMENTS

Figure 1:
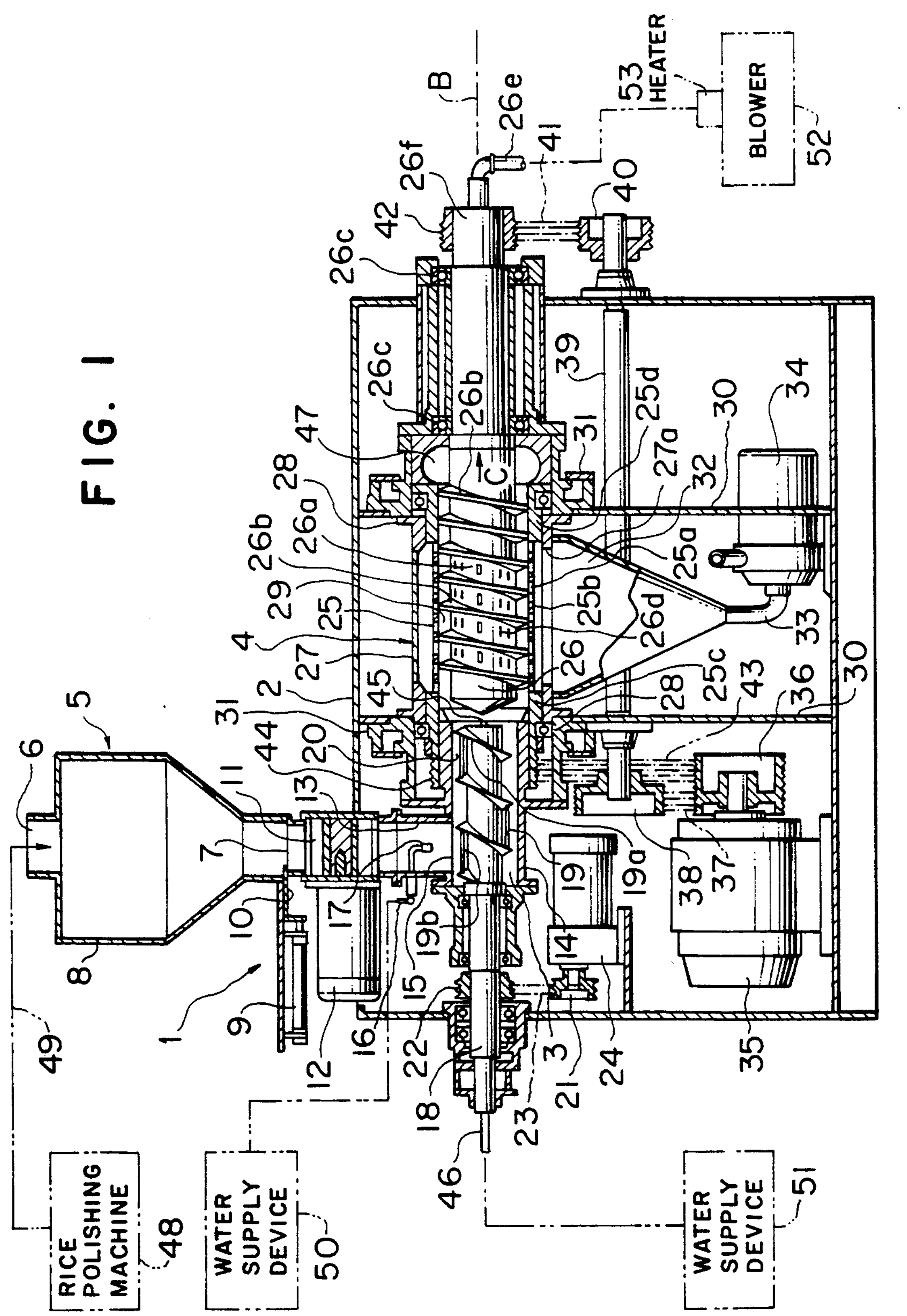
FIG. 1 is a vertical sectional view of a washed rice producing apparatus according to a first embodiment of the present invention.

FIGS. 1 illustrates a washed rice producing apparatus 1 according to the first embodiment of the present invention. The washed rice producing apparatus 1 is provided within a casing or frame 2 thereof with a rice-washing station 3 and a dewatering station 4. Provided above the rice-washing station 3 is a polished rice supply station 5 which supplies polished rice to be washed to the rice-washing station 3.

The polished rice supply station 5 includes a supply tank 8 which is provided at its top with a polished rice charging port 6 and at its bottom with a polished rice supply port or supply tube 7. The tubular supply port 7 is provided with a supply shutter 10 which is horizontally moved by an air cylinder 9 to open/close the supply port 7. The supply port 7 further has a rotary valve 11 mounted at a lower portion thereof for discharging a predetermined amount of polished rice. The rotary motion of the rotary valve 11 is controlled by a motor 12. A rice feeding tube 13 is mounted to the lower end of the supply port 7. The rice feeding tube 13 is provided at the lower end thereof with a rice supply port 15 which opens to an inlet side of a rice-washing tube 14 of the rice washing station 3 fixed to the frame 2. A water supply tube 16 is mounted to the rice feeding tube 13, and feeds rice-washing water to the rice-washing tube 14 from a nozzle 17 attached to the distal end thereof.

The rice-washing station 3 is provided within the rice-washing tube 14 with an agitating or stirring rotor 19 attached to a horizontal rotary shaft 18. The agitating rotor 19 has a spiral agitator or stirrer 19*a* and axially extending agitators or stirrers 19*b* integrally formed with it. Thus, the hollow cylindrical rice-washing tube 14 and the agitating rotor 19 define a substantially annular rice-washing chamber 20 between them. The rotary shaft 18 of the agitating rotor 19 is rotated by a motor 24 through pulleys 21 and 22 and a belt 23. Downstream end portions of the rice washing tube 14 and the agitating rotor 19 are placed closely to the dewatering station 4.

The dewatering station 4 includes a rotatable perforated tube 25, a rice convey tube 26 concentrically arranged with the perforated tube 25 for rotation independent of the perforated tube 25, and a dewatering tube 27 concentrically arranged to externally surround the perforated tube 25. The rice convey tube 26 includes a tubular body 26a which is rotatable about a horizontal axis B, and a spiral member 26b mounted around the tubular body 26a. The spiral member 26b is rotated together with the tubular body 26a for transporting washed rice in an axial direction C of the tubular body 26a, while imparting a high speed rotation to the washed rice. The reference symbol 26c designates a bearing for the rice convey tube 26. The tubular body 26a of the rice convey tube 26 has many air supply holes 26d formed through it. Air flows from an air duct 26e to the air supply holes 26d through a tubular body 26f, coaxial with the tubular body 26a, and the tubular body 26a. The perforated tube 25 includes a central portion 25b having many penetrating holes 25a formed through it. The penetrating holes 25a are smaller in diameter than rice grain. The perforated tube 25 further has an upstream cylindrical tube 25c and a downstream cylindrical tube 25d rotatably supported on bearings 28. The upstream cylindrical tube 25c and the downstream cylindrical tube 25d are coaxially jointed to respective opposite ends of the central portion 25b. The upstream cylindrical tube 25c is rotatably fitted around a downstream end portion of the rice-washing tube 14. The perforated tube 25 is rotated at a speed slightly different from the rotational speed of the rice convey tube 26, and allows water to be discharged outside, the water having been centrifugally separated from rice in a dewatering chamber 29 defined between the perforated tube 25 and the rice convey tube 26. The dewatering tube 27 is mounted to a pair of attachment members 31 and 31 which are mounted to the frame 2 through respective supporting plates 30 and 30. The attachment members 31 and 31 support the bearings 28 of the perforated tube 25. The substantially hollow cylindrical dewatering tube 27 is provided in a lower side thereof with a relatively large opening 27a. The inner space of the dewatering tube 27 communicates to a conical water suction chamber defining member 32 through the opening 27a, and is further connected to a suction pump 34 through a water suction tube 33. The reference numeral 35 indicates an electric motor which actuates a dewatering station 4. The torque of the output shaft of the motor 35 is, on one hand, imparted to the tubular body 26a through a pulley 36, a belt 37, a pulley 38, a connection shaft 39, a pulley 40, a belt 41 and a pulley 42, and is, on the other hand, transmitted to the perforated tube 25 through a pulley 36, a belt 43 and a pulley 44.

The agitating rotor 19 is provided at a distal end thereof with a nozzle 45. Water is fed to this nozzle 45 from a water supply tube 46 through a rotary shaft 18 and the agitating rotor 19. The reference numeral 47 designates a rice discharge port for discharging washed rice which has been washed in the rice-washing station 3 and dewatered in the dewatering station 4.

In operation, the polished rice supply station 5 of the washed rice producing apparatus 1 is continuously or intermittently supplied with polished rice from a rice polishing machine 48 through a polished rice supply passage 49 and a polished rice charging port 6 of the supply tank 8. When the motors 12, 24 and 35 are energized, and the rotary valve 11 of the polished rice supply station 5, the agitating rotor 19 of the rice-washing station 3, and the rice convey tube 26 and perforated tube 25 of the dewatering station 4 are rotated respectively. The suction pump 34 is energized, so that air in the dewatering tube 27 of the dewatering station 4 is evacuated. When the supply shutter 10 is moved to open the port 7 by actuating the air cylinder 9, polished rice in a lower portion of the supply tank 8 is fed to the rotary valve 11. The rotary valve 11 which is being rotated allows a predetermined amount of the polished rice to be passed therethrough by every predetermined degree of revolution to an inlet side of the rice-washing chamber 20 of the rice washing station 3 through the rice-feeding tube 13. While polished rice flows down through the rice-feeding tube 13, water is supplied to the inlet side of the rice-washing chamber 20 from a water supply device 50 through the water supply tube 16 and the nozzle 17.

The polished rice which has been supplied to the rice washing chamber 20 is agitated by the agitating rotor 19 in the presence of water, for example, and thereby flows, rubbing against each other while being rotated to be washed with water. By this operation the bran powder or layer remained on surfaces of the polished rice grains is separated therefrom and is dissolved into water. The period of rice-washing time is about 10 to 15 sec., for example.

Polished rice having been thus washed is then transported to the dewatering chamber 29 by means of the spiral portion 19a of the agitating rotor 19. The washed rice sent from the rice-washing chamber 20 is rewashed at the outlet of the rice-washing chamber 20 with water supplied from the water supply device 51 through the water supply tube 46 and the nozzle 45. This amount of water for washing and rewashing the polished rice depends upon the polishing processing to which the polished rice having been subjected but may for example be about 50% by weight of the polished rice.

After the rewashing, rice is sent to the dewatering station 4, where it is rotated at a high speed by the rice convey tube 26 (rotation speed: 1,500–2,000 r.p.m. for example) and the perforated tube 25 (rotation speed: smaller the tube 26 by about 100 r.p.m. for example) in the dewatering chamber 29. The rice is sent by the spiral member 26b in the direction C while bran having been separated from the surface of the rice and dissolved in the water is removed together with the water through the perforation or penetrating holes 25a in the perforated tube 25 to the outside of the dewatering chamber 29. Since the perforated tube 25 is rotated at a speed roughtly equal to and slightly smaller than the rice convey tube 26, the rice in the dewatering chamber 29 is also rotated at a speed roughly equal to the speed of the perforated tube 25. The bran-containing water is hence effectively drained through the penetrating holes 25a of the perforated tube 25. The bran-containing water which has been discharged through the penetrating holes 25a is drained off through the dewatering tube 27, the water suction chamber defining member 32, the water suction tube 33 and the suction pump 34.

The washed rice in the dewatering chamber 29, while thus undergoing dewatering, is also dried by removal of water from surfaces of rice grains with air which is forcedly sent from the blower 52 to the dewatering chamber 29 through the air duct 26e and air supply holes 26d. The drying air may be heated by a heater 53 for enhancing drying. In the case in which air flow due to evacuation of the suction pump 34 is sufficiently large, the blower 52 may be omitted. In this embodiment, the supply (percentage) of water at the rice-washing station 3 is relatively small, and hence rice-washing takes relatively short time, which reduces the amount of water which permeates into rice grains during rice-washing, and hence surfaces of rice may be dried by only air flow to remove surface water thereof. Thus, the drying of rice is achieved with ease.

The rice which has been subjected to dewatering and drying in the dewatering chamber 29 is sent out of the dewatering chamber 29 by the spiral member 26*b*, is discharged outside through the rice discharge port 47, and is then sent to a storage tank through a cyclone (not shown).

Fine cracks are produced in polished rice grains, or washed rice grains, produced in the foregoing processing due to washing-dewatering-drying particularly due to drying. These fine cracks serve to absorb the supplied water into rice grains in a short time upon boiling rice. This washed rice need not be washed further with water before being boiled, and hence does not produce waste water accompanied with the further washing. Furthermore, because water has permeated into the interior of grains or kernels to some extent, and because rice is likely to absorb water upon contacting water, there is little possibility of producing boiled rice with hard cores even if rice is not steeped or dipped in water for a long or substantial time before boiling. Thus, boiled rice with an excellent taste is produced with ease.

Figure 2:
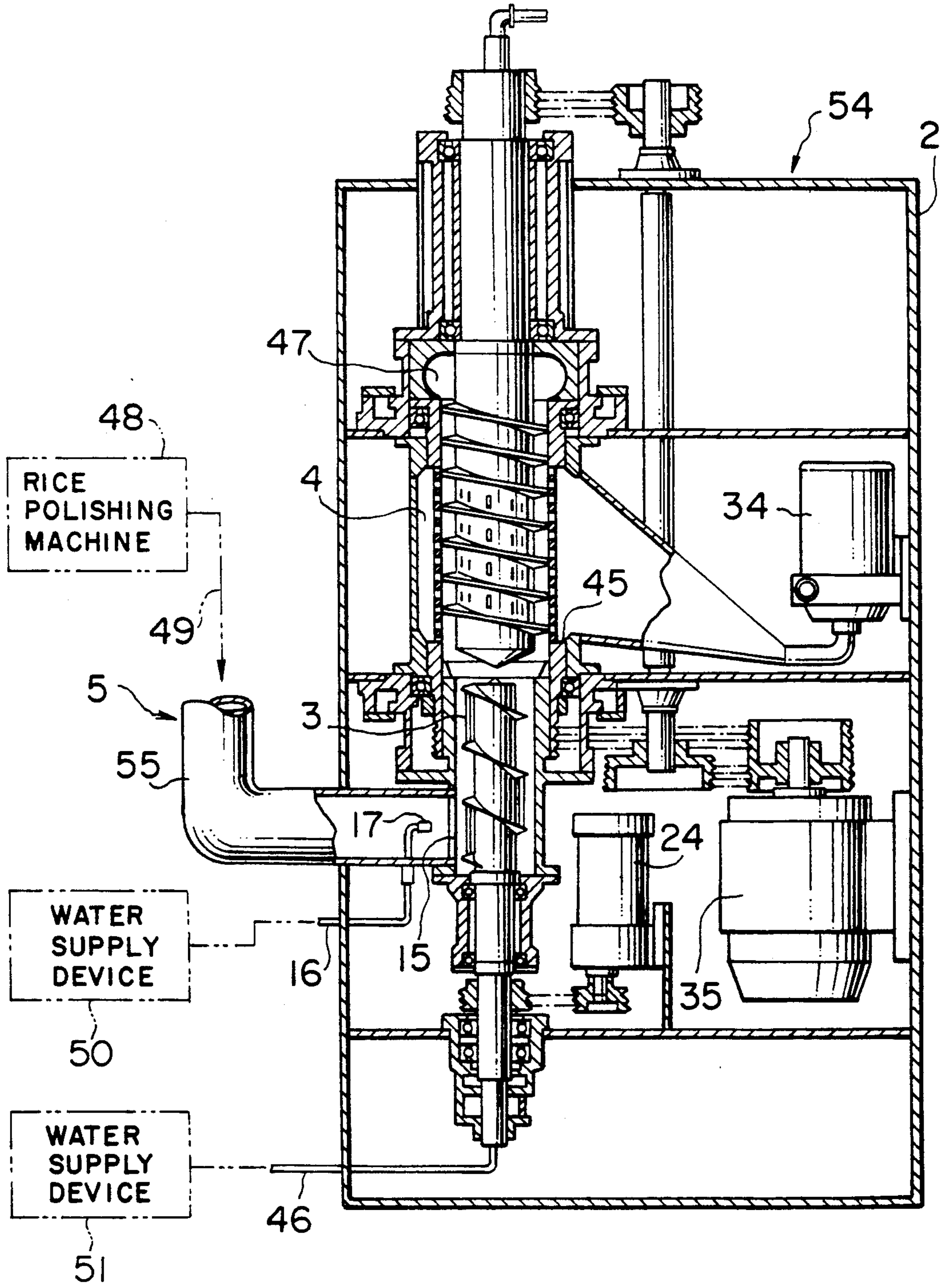
FIG. 2 is a vertical sectional view of a washed rice producing apparatus according to a second embodiment of the present invention.

FIG. 2 is a vertical sectional view of a washed rice producing apparatus 54 according to the second embodiment of the present invention. The washed rice producing apparatus 54 is distinct from the washed rice producing apparatus 1 of the first embodiment in the following points; the rice-washing station 3 and the dewatering station 4 are vertically arranged; polished rice is received in the polished rice supply station 5 from the rice polishing machine 48 through a rice supply tube 55 which transports polished rice by pressurized air flow; and the nozzle 17 horizontally faces the rice supply port 15. The washed rice producing apparatus 54 has substantially the same construction as the washed rice producing apparatus 1 in the other points or respects.

In this washed rice producing apparatus 54, because the rice-washing station 3 and the dewatering station 4 are arranged vertically in series, the space necessary to install the whole equipment is reduced. This enables the equipment to be installed in relatively narrow workshops.

Figure 4:
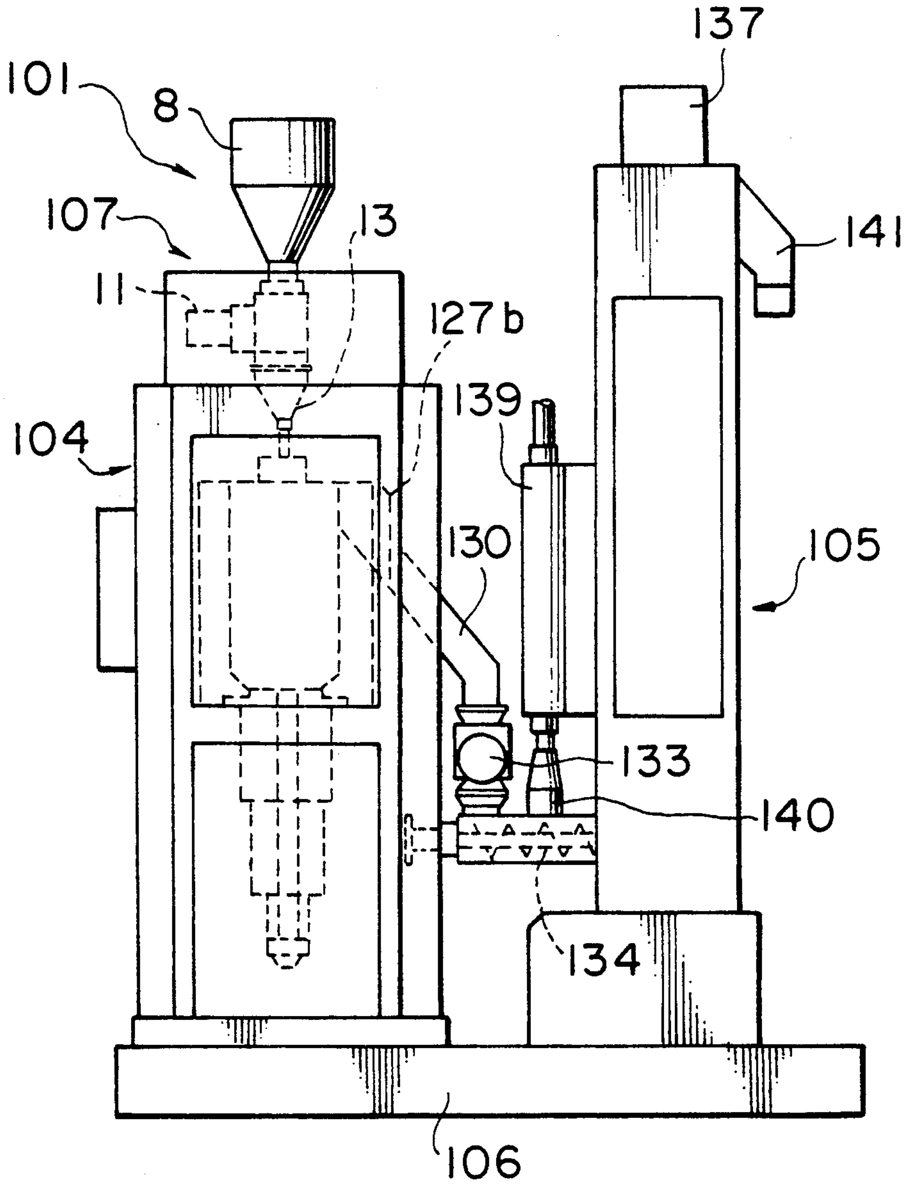

FIGS. 3 to 5 illustrates a washed rice producing apparatus 101 according to the third embodiment of the present invention. In the washed rice producing apparatus 101, parts or members which are similar to those of the apparatuses of the first and the second embodiments are designated by the same reference numerals.

In the washed rice producing apparatus 101, a rice-washing station 102 and a dewatering station 103 are concentrically and vertically arranged in the form of a rice-washing and dewatering station 104. A drying station 105 is integrally mounted to the rice-washing and dewatering station 104 through a frame 106. The rice-washing and dewatering station 104 includes a rice supply station 107 which has the rotary valve 11 and the supply tank 8 connected to the rice polishing machine 48 through the polished rice supply passage 49. Polished rice is introduced from the rotary valve 11 into an inlet 108 of the rice-washing station 102 through a rice-feeding tube 13. Water is supplied from the water supply device 50 to the rice-feeding tube 13 through an electromagnetic valve 109 and a flow-meter 110.

As best shown in FIG. 5, the rice-washing and dewatering station 104 includes a base frame 111. An electric motor 112 is mounted to one side wall of the base frame 111, and the torque of the output shaft of the motor 112 is transmitted, on one hand, to a main shaft 116 through a pulley 113, a belt 114 and a pulley 115, and, on the other hand, to a hollow rotary shaft 120 concentric with the main shaft 116 through a pulley 117, a belt 118 and a pulley 119. Reference numerals 121, 122 and 123 designate a tension pulley, a bearing of the hollow rotary shaft 120, and a bearing of the main shaft 116, respectively. The main shaft 116 is connected to an agitating or stirring rotor 19 of the rice-washing station 102 through a connecting shaft 124. The agitating rotor 19 has agitators or stirrers 19*c* mounted to it. The agitators 19*c* are fixed at radially outer ends thereof to the rice-washing tube 125, and a spiral member 126 is attached to the outer circumferential wall of the rice washing tube 125. Thus, in this embodiment, the rice-washing tube 125 which defines the outer circumference of the rice-washing chamber 20 is rotated together with the main shaft 116 as well as the agitating rotor 19 placed inside the rice-washing tube 125. A perforated tube 25 which is concentric with both the agitating rotor 19 and the rice washing tube 125 is connected to the hollow rotary shaft 120 through a rotary table 126*a*. The perforated tube 25 defines a dewatering chamber 29 in cooperation with the rice-washing tube 125. The dewatering chamber 29 communicates at a lower end thereof to the rice-washing chamber 20 and at the upper end to a rice discharge port 127*a*. The rice discharge port 127*a* communicates to a rice discharge through 127*b*. The reference numeral 127 indicates a frame of the dewatering station 103 which serves as a dewatering cylinder, and water within the frame 127 is drained off by a suction pump 34 through a drain port 128, a drain pipe 129, and an electromagnetic valve 129*a* (FIG. 3). The rice discharge trough 127*b* is connected to a rice discharging tube 130, which is provided with an pneumatically-operated shutter 131. Water is supplied from a water supply pipe 132 to an upperstream region of the rice discharging tube 130 for rewashing rice grains which flow down through the rice discharging tube 130. The rice discharging tube 130 is provided at a bottom region thereof with a perforated wall, and the rice discharging tube 130 is inclined at such a degree that water adhering to rice grains which flow down through the rice discharging tube 130 may be drained off by gravity through perforations in the perforated bottom wall.

The rice discharging tube 130 of the rice-washing and dewatering station 104 is connected to a screw conveyer 134 of the drying station 105 through a rotary valve 133. The screw conveyer 134 is connected at a downstream end portion thereof to a lower end portion 135*a* of an erected or vertical screw conveyer 135. The conveyors 134 and 135 are driven by motors 136*a* and 136*b*, respectively. The reference numeral 137 designates an air suction device, and by the operation of the suction device 137 heated air is introduced into and passes a tubular body 134*a* of the screw conveyer 134 and a tubular body 135*b* of the screw conveyer 135 through a filter 138, a heater 139 and an air supply tube 140. A rice discharging opening 135*c* of the screw conveyer 135 is connected to a rice discharge tube 141, which is in turn connected to a lower rice discharge tube 143 through a rotary valve 142.. The reference numeral 144 indicates a rice elevator for sending dried, washed rice to a storage shed. Various components of the drying station 105 having the foregoing construction are, as whole, mounted on the frame 106.

The reference numeral 146 designates an electromagnetic valve, which controls supply of air to prevent adhesion of substances, such as bran. The reference numeral 147 is an pneumatically operated shutter to discharge polished rice remained in the screw conveyer 135 of the drying station 105 when drying operation of the drying station 105 has been completed.

The washed rice producing apparatus 101 thus constructed is operated in a manner substantially similar to the washed rice producing apparatus 1. Thus, brief explanation will be given about the washed rice producing apparatus 101. Polished rice which has been polished in the rice polishing or milling machine 48 at an appropriate yield has a water content of about 14% by weight. The polished rice is intermittently fed through the rotary valve 11 to the rice-washing chamber 20, where it is mixed with a predetermined amount of water from the water supply device 50 and is washed with water under forced rotation by the agitator 19*c* rotated at 1500 to 2000 r.p.m., for example. Washed rice enters the dewatering chamber 29 from a lower portion of the rice washing chamber 20, where it is conveyed upwardly under forced rotation by the spiral member 126. Bran-containing water which has been separated from polished rice grains in the dewatering chamber 29 is discharged through perforations 25*a* of the perforated tube 25 which is rotated at a speed slower by about 100 r.p.m. for example than the rice washing tube 125. The discharged bran-containing water is drained off through the drain port 128, and is discharged outside the apparatus by the suction pump 34 through the valve 129*a*. Dewatered, polished rice is sent from the rice discharge port 127*a* to rotary valve 133 of the drying station 105 through the rice discharge trough 127*b* and the rice discharging tube 130. When the washed polished rice grains flow down through the rice discharging tube 130, water adhered to it drops through the perforations in the perforated bottom wall of the rice discharging tube 130, and are then discharged outside by the suction pump 34. The time required for washing and dewatering rice in this rice-washing and dewatering station 104 is about 5 to 45 seconds. Polished rice grains whose water content has increased by about 1.5 to 3.5% by weight are intermittently sent to the screw conveyer 134 through the rotary valve 133 of the drying station 105. While being conveyed by the conveyors 134 and 135, washed polished rice grains are dried by hot air which has been heated by the heater 139 and flows through the conveyors 134 and 135 under the action of the suction device 137. The dried polished rice is discharged in the form of washed rice through the rice discharge opening 135*c*, and is then sent to the next processing through the rice discharge tube 141, the rotary valve 142, the rice discharge tube 143 and the elevator 144. The drying time in the drying station 105 is about 20 to 120 seconds. By the drying in the drying station 105, the water content of the washed polished rice decreases by 1 to 2% by weight, and eventually washed rice of which water content is about 14.7 to 16.0% by weight is produced.

Dew condensation which is liable to take place when polished rice flows down in the rice discharge tube 143 is prevented by supplying cool air by a fan 145. In cleaning the rice-washing and dewatering station 104 after completion of the rice-washing, water is introduced into it with the rice discharging tube 130 closed by the pneumatically operated shutter 131.

Also, polished rice produced in the foregoing processing, i.e. washed polished rice, need not be washed further with water before being boiled, and hence does not produce waste water. Moreover, boiled rice with an excellent taste may be produced without steeping or dipping the thus produced washed rice in water for a substantial time period before boiling since there is little possibility of providing hard cores to the boiled rice.

FIGS. 6 to 8 illustrate washed rice producing apparatuses 150, 155 and 165 according to fourth to sixth embodiments of the present invention, respectively, and the washed rice producing apparatuses 150, 155 and 165 are modifications of the washed rice producing apparatus 101 of the third embodiment.

The washed rice producing apparatus 150 of FIG. 6 has the same structure in the rice-washing and dewatering station 104 and the dewatering station 103 as the washed rice producing apparatus 101, but the polished rice supply station 151 of the former is distinct in structure from the rice supply station 107 of the latter. More specifically, in the polished rice supply station 151 of the washed rice producing apparatus 150, a polished rice supply tank or hopper 8 is connected to a mixing tank 152 through a rotary valve 11. The mixing tank 152 is supplied with water, at a predetermined proportion relative to the polish rice, from a water supply device 50 through an electromagnetic valve 109. A mixture of polished rice and water is fed to an inlet 108 of a rice-washing station 102 of a rice-washing and dewatering station 104 through a pump 153.

In this washed rice producing apparatus 150, polished rice in the supply tank 8 is intermittently discharged by a rotary valve 11, and is then mixed with water in the mixing tank 152. In mixing with water in the mixing tank 152, polished rice undergoes preliminary washing, after which polished rice is subjected to weak rice-washing and dewatering in the rice-washing and dewatering station 104 to produce washed rice.

In the washed rice producing apparatus 155 of FIG. 7, the rice supply station 107 and the rice-washing and dewatering station are constructed similarly as in the washed rice producing apparatus 101 but a drying station 156 of the formed is distinct from the drying station 105 of the latter. In the drying station 156 of the washed rice producing apparatus 155, a rice discharging tube 130 of a rice-washing and dewatering station 104 is connected to a supply tube 158 of a horizontal drying station 157 through a rotary valve 133. The horizontal drying station 157 includes a casing 159 and a perforated rotary tube 160 disposed within the casing 159 so that the outlet side thereof is slightly lower than the inlet side. Outside air is introduced into the casing 159 through a filter 138, a blower or fan 161, a heater 139, and an air intake tube 140, and is exhausted through an exhaust tube 162 after passing through the casing 159. The reference numeral 163 designates a rice discharge tube which is connected to a rotary valve 142 for discharging washed rice produced.

In this washed rice producing apparatus 155, polished rice which has been subjected to rice-washing and dewatering processing in the rice-washing and dewatering station 104 flows down through the rice discharging tube 130, and is then intermittently fed by the rotary valve 133 so that the polished rice is charged into the perforated rotary tube 160 through the supply tube 158. While being agitated and flowing in the perforated rotary tube 160, polished rice is dried by air supplied from the air intake tube 140, and is then discharged as washed rice through the rice discharge tube 163.

In the washed rice producing apparatus 165 according to the sixth embodiment of the present invention as shown in FIG. 8, the drying station 105 of the washed rice producing apparatus 150 of FIG. 6 is replaced by the drying station 156 of the washed rice producing apparatus 155 of FIG. 7, and the washed rice producing apparatus 165 operates similarly with the washed rice producing apparatuses 150 and 155 in corresponding parts.

Referring to FIGS. 9 and 10, a washed rice producing apparatus 201 according to the seventh embodiment of the present invention will be described hereinafter. In the washed rice producing apparatus 201, parts or elements corresponding to or similar to parts or elements of washed rice producing apparatuses 1, 101, 150, 155 and 165 are allotted the same reference numerals.

A supply station 202 of the washed rice producing apparatus 201 includes the mixing tank 152 as in the polished rice supply station 151 of the washed rice producing apparatus 150. The reference numeral 152*a* designates a level meter to keep the level of the mixture in the mixing tank 152. The supply station 202 is further provided with pumps 203, 204 and 205 and switch valves 206 and 207.

A rice-washing and dewatering station 208 of the washed rice producing apparatus 201 is constructed similarly with the rice-washing and dewatering station 104 of the washed rice producing apparatus 101, but is distinct therefrom in the following points. A rice-washing chamber 20 is defined at a lower portion of the rice washing tube 125, and hence an agitator or stirrer 209 is also secured to a lower portion of the rice washing tube 125 through a connecting member 210. The upper space of the rice washing tube 125 is partitioned into three chambers 214, 215 and 216 by tubular members 212 and 213 which are connected to a conical portion 211 of the connecting member 210. The tubular member 212 is connected to a pump 205, receives polished rice and water from the mixing tank 152, and leads polished rice and water to the rice-washing chamber 20 through the chamber 214 which serves as an introduction conduit. The chambers 215 and 216 communicate to each other through holes 217 formed in a lower portion of the tubular member 213. The chamber 216 further communicates to a dewatering chamber 29 at a lower portion of the chamber 216 through holes 218 in the rice-washing tube 125. Water is supplied to the chamber 215 from a water supply device 219 through a water supply tube 220. Water which has entered the chamber 215 is introduced into chamber 216 through the holes 217, and is then injected into an intermediate portion 29*a* of a dewatering chamber 29 through holes 218 which serve as nozzles upon high speed rotation of the a rice-washing tube 125. In this embodiment, the chambers 215 and 216 serve as water supply passage from the water supply tube 220 to the nozzle 218. Water which has been injected into the intermediate portion 29*a* of the dewatering chamber 29 rewashes polished rice having dewatered in a lower portion 29*b* of the dewatering chamber 29. Rewashed polished rice is dewatered in an upper portion 29*c* of the dewatering chamber 29 again.

The rice discharge tube 130 of the rice-washing and dewatering station 201 communicates to a horizontal drying station 157 through a rotary valve 133. A drying station 221 of the washed rice producing apparatus 201 includes the horizontal drying station 157 and a second drying station 222 connected in series to the horizontal drying station 157. The second drying station 222 has a structure similar to the dewatering station 103 of the washed rice producing apparatus 101. Polished rice discharged from the horizontal drying station 157 is fed through a rotary valve 133*a*, which is similar to the rotary valve 133, into the second drying station 222, where it is dried and is then sent as washed rice to the next processing by a conveyer 144.

Reference numerals 223 and 224 indicate water storage tanks, of which inlets are communicated to a water supplying device 226 through a switch valve 225 and to a pump 34 of the rice-washing and dewatering station 208 through a switch valve 227. The water storage tanks 223 and 224 are communicated to a mixing tank 152 and a raw water tank 231 of a bacteria cleaning unit 230 through switch valves 228 and 229. The reference numeral 232 indicates a concentration measuring device for measuring a concentration of bran in water. The bacteria cleaning unit 230 includes a coagulating tank 233 for adding a coagulant, such as $CaCl_2$, a coagulating sedimentation tank 234, an activated sludge tank 235 for adding activated sludge bacteria, and a precipitator or sedimentation tank 236 as well as the raw water tank 231.

Parts of washed rice producing apparatus 201 thus constructed are operated in a manner similar to corresponding parts of the washed rice producing apparatuses 1, 101, 150, 155 and 165. Water is supplied from the water supply device 226 to the water storage tank 223 through the switch valve 225. Water in the water storage tank 223 is introduced into the mixing tank 152 through a switch valve 228 to a predetermined level regulated by the level meter 152*a*. Then, a predetermined amount of polished rice is introduced into the mixing tank 152 by the rotary valve 11. After preliminary rice-washing in the mixing tank 152, polished rice is sent together with water to the rice-washing and dewatering station 208 through the pump 203. In the case where polished rice is a fresh rice ("shin-mai" or "shin-gome"), for example, which can be washed with water relatively easily, the rice is directly sent from the pump 203 to the rice-washing and dewatering station 208 through the valve 206. On the other hand, polished rice which is a rice relatively hard to be washed with water, such as an old rice ("ko-mai": harvested last year), is sent to the rice-washing and dewatering station 208 through the valve 207 after passing pumps 203 and 204. Furthermore, when the polished rice, which is very hard to be washed such as very old rice ("ko-ko-mai"), is to be washed, it is conveyed to the rice-washing and dewatering station 208 through pumps 203, 204 and 205. The switch valves 206 and 207 are manually controlled or automatically controlled by a control unit (not shown) according to kinds of polished rice to be washed. The number of times of the preliminary rice-washing is increased by increasing the number of the pumps through which the polished rice passes.

Polished rice fed to the rice-washing and dewatering station 208 together with a predetermined Proportion or percentage of water undergoes washing in the rice-washing chamber 20 of the rice-washing station 237, is then subjected to initial dewatering in the dewatering chamber 29*b* at the lower portion of the dewatering station 238, is further rewashed at the intermediate portion 29*a* to remove substances, such as bran, adhering to surfaces thereof, and is then dewatered in the upper dewatering chamber 29*c*.

Waste water drained off is sent from the drain port 128 to the storage tank 223 through the switch valve 227, and is then recirculated to the mixing tank 152 through the switch valve 228.

Polished rice discharged from the rice discharge tube 130 is dried in the horizontal dryer 157 to mainly remove water around the surface regions of the rice grains, and the water content thereof is reduced by 1 to 2% by weight. In the vertical second dryer 222, polished rice is dried and is also polished by being rubbed against each other under the heated dry air and under the action of the screw conveyer 135*a*. Water content of washed rice thus produced is measured by a moisture meter 239 provided or the rice discharge tube 141, and the temperature of the hot air is regulated by adjusting the heater 139*a* so the measured water content becomes a predetermined level. In the case where it is hard to adjust the water content to the predetermined level by this temperature control, flow rate of air by the evacuation or suction device 137 is adjusted to regulate the water content.

Rice-washing and dewatering time, drying time, magnitudes of change of water content after the rice washing and dewatering processing and the drying processing, and water content of washed rice produced are the same as those in the washed rice producing apparatus 101.

In the embodiment of FIG. 9, holes 219 which serve as nozzles are formed at one vertical position or level, but nozzle holes 218 may be provided in the rice-washing tube 125 at plural vertical positions or levels for performing rewashing and dewatering operations plural times.

When the concentration measuring unit 232 detects that BOD (Biochemical Oxygen Demand) of water which has been used for rice-washing in the washed rice producing apparatus 201 and returned to the water storage tank 223 for recirculation reaches to about 10,000 ppm for example, the switch valve 228 is switched, and thereby water in the tank 223 is sent to the raw water tank 231. At the same time, water in the water supply device 226 is sent to the water storage tank 224 by switching the switch valve 225. Water in the water storage tank 224 is sent to the mixing tank 152 through switch valve 229, and is similarly used for rice-washing in a repeated manner until BOD reaches about 10,000 ppm. When water in the water storage tank 224 reaches about 10,000 ppm, water supply is switched to the water storage tank 223 as in the case previously described.

Waste rice-washing water introduced into the raw water tank 231 of the bacteria cleaning unit 230 is subjected to sterilization by adding chlorine and a similar disinfectant. After the sterilization, the waste water is sent to the coagulating tank 233 for adding the coagulant, and is then sent to the coagulating sedimentation tank 234, where a coagulation precipitate is condensed and deposited on the bottom. In the tank 234, BOD of the supernatant liquid of the waste water decreases down to about 2000 to 3000 ppm. This reduced BOD of waste water is transported to the activated sludge tank 235, where activated sludge bacteria is added to the water, and the water is exposed to air. Then, the waste water is sent to the precipitator 236, where remaining organic substances in the waste water are precipitated together with sludge bacteria. On the other hand, supernatant purified water in the precipitator 236 is discharged.

What is claimed is:

1. A washed rice producing apparatus comprising:

a frame;

a first tubular member, arranged in the frame, for defining a rice-washing chamber therein for washing polished rice introduced therein from one end thereof, the rice-washing chamber having a discharge end portion;

agitating means, arranged within the first tubular member, for agitating the polished rice in the rice-washing chamber;

a spiral member supported on the frame to be rotatable about an axis thereof for transporting washed, polished rice discharged from the discharge end portion of the rice-washing chamber while dewatering the washed polished rice; and a second tubular member provided in the frame to be rotatable about the axis and to externally surround the spiral member for defining a dewatering chamber in cooperation with the spiral member, the second tubular member including a circumferential wall having plural penetrating holes formed therethrough for draining off water separated from the washed polished rice transported by the spiral member.

2. A washed rice producing apparatus as recited in claim 1, wherein the first and second tubular members are arranged substantially in series so that the washed polished rice discharged from the rice-washing chamber enters the dewatering chamber; and in the dewatering chamber within the second tubular member the washed polished rice is dried.

3. A washed rice producing apparatus as recited in claim 2, wherein the axis of each of the first and second tubular members is horizontal.

4. A washed rice producing apparatus as recited in claim 2, wherein the axis of each of the first and second tubular members is vertical; and the second tubular member is located above the first tubular member.

5. A washed rice producing apparatus as recited in claim 1, wherein the first tubular member is rotatable about a vertical axis thereof and is arranged to receive polished rice at an upper end thereof;

the spiral member is disposed around outer circumferential wall of the first tubular member so that washed polished rice deposited at a lower portion of the rice-washing chamber is elevated along the outer circumferential wall of the first tubular member while being dewatered; and the second tubular member is rotatable about the axis relative to the first tubular member.

6. A washed rice producing apparatus comprising:

a first tubular member, rotatable about a vertical axis thereof, for defining a rice-washing chamber therein for washing polished rice introduced therein from an upper portion thereof;

a spiral member, disposed around an outer circumferential wall of the first tubular member so that washed polished rice deposited at a lower portion of the rice-washing chamber is elevated along the outer circumferential wall of the first tubular member; and a second tubular member, rotatable about the axis relative to the first tubular member and externally surrounding the spiral member for defining a dewatering chamber in cooperation with both the first tubular chamber and the spiral member, the second tubular member including a circumferential wall having plural penetrating holes formed therethrough for draining off water separated from the washed polished rice transported by the spiral member.

7. A washed rice producing apparatus as recited in claim 6, wherein the dewatering chamber extends vertically upwardly, and said apparatus further comprises rewashing water supplying means, disposed in an intermediate portion of the dewatering chamber, for supplying water to rewash washed polished rice.

8. A washed rice producing apparatus as recited in claim 7, wherein the rewashing water supplying means comprises nozzle means extending through the wall of the first tubular member and opening to the dewatering chamber.

* * * * *